M. B. Stafford,
Brick Mold,
N°57,791. Patented Sept. 4, 1866.
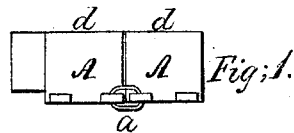
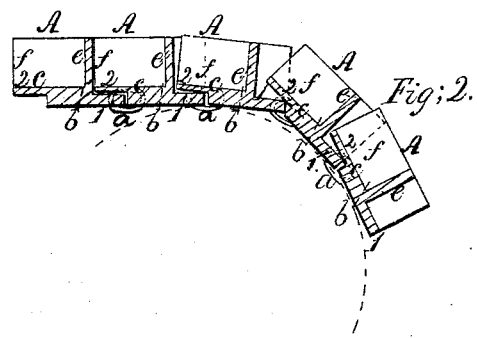
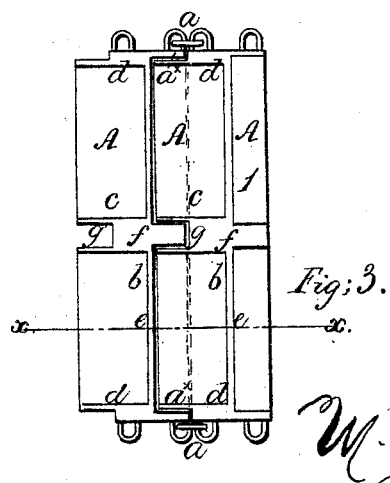
Witnesses.
J. W. B. Covington
Wm Trevin
Inventor.
M. B. Stafford
Per Munn & Co
Attorneys

UNITED STATES PATENT OFFICE.

M. B. STAFFORD, OF NEW YORK, N. Y.

IMPROVED CONSTRUCTION OF JOINTED MOLDS.

Specification forming part of Letters Patent No. 57,791, dated September 4, 1866.

*To all whom it may concern:*

Be it known that I, M. B. STAFFORD, of the city, county, and State of New York, have invented a new and useful Improvement in the Construction of Jointed Molds; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, a side sectional view of the same, taken in the line $x\,x$, Fig. 3; Fig. 3, a plan or top view of the same.

Similar letters of reference indicate like parts.

This invention relates to a new and useful improvement in jointed molds for brick, peat, soap, and other machines for compressing and molding various substances.

The object of the invention is to obtain a mold of the kind specified, which will open freely and close tightly in such a manner as to leave no mark, impression, or ridge in the article molded.

A represents a series of molds, which are connected together by joints $a$, so as to form a flexible belt of molds. Each mold is composed of two parts, $b\,b$, the several parts being constructed precisely alike and connected by the joints $a$. These parts of the molds are composed each of a bottom piece, $c$, end pieces, $d$, and a side piece, $e$, the ends of the latter joining the end pieces, $d\,d$, at some distance from one end, and extending from the bottom piece, $c$, at some distance from one edge; and at the center of each part $b$ there is a transverse partition, $f$, one end of which is flush or in line with one edge of the bottom piece, $c$, while the other end, which is flush or in line with the opposite edge of the bottom piece, $c$, has a groove or recess, $g$, made in it.

The part 1 of the bottom piece, $c$, at one side of the side piece, $e$, is narrower than the part 2 at the opposite side, as shown in Figs. 2 and 3; and when the parts $b$ are connected together the part 2 of the bottom $c$ of one part of a mold will lap entirely over the part 1 of the bottom $c$ of the adjoining part of the mold, as shown clearly in Fig. 2, and the ends of the end pieces, $d\,d$, of said part of the mold will abut against the side piece, $e$, of the adjoining part of the mold near its ends, the outer surfaces of the end pieces, $d\,d$, being halved out, as shown at $a'$, near one end, so as to secure the end pieces, $d\,d$, of the adjoining part of the mold, as shown clearly in Fig. 3, and the groove or recess $g$ in the partition $f$ receives the end of the partition $f$ of the adjoining part of the mold. By this means two parts, $b\,b$, when closed, will form a close or tight mold, which will leave no crease, impression, or ridge in the article molded, and the molds can pass around pulleys with the greatest facility, and said parts open and close freely.

Having thus described my invention, I claim as new and desire to secure by Letters Patent—

A jointed mold composed of two parts, $b\,b$, connected together and constructed substantially as herein shown and described, so that when said parts are closed a smooth interior is obtained and the article or substance compressed and molded without leaving any crease, impression, or ridge, as set forth.

M. B. STAFFORD.

Witnesses:
WM. F. MCNAMARA,
ALEX. F. ROBERTS.